United States Patent [19]

Nakamura

[11] Patent Number: 5,233,648
[45] Date of Patent: Aug. 3, 1993

[54] DIRECT DIALING-IN METHOD IN A PABX
[75] Inventor: Yuzi Nakamura, Sagamihara, Japan
[73] Assignee: Matsushita Electric Industrial Co., Ltd., Osaka, Japan
[21] Appl. No.: 796,807
[22] Filed: Nov. 25, 1991
[30] Foreign Application Priority Data Nov. 29, 1990 [JP] Japan .................. 2-333866

[51] Int. Cl.⁵ .................. H04M 7/00; H04M 11/00; H04M 3/42; H04J 3/12
[52] U.S. Cl. .................. 379/233; 379/93; 379/94; 379/210; 379/211; 379/231; 370/110.1
[58] Field of Search .................. 379/94, 231, 233, 93, 379/210, 211; 370/110.1

[56] References Cited

U.S. PATENT DOCUMENTS

| | | | |
|---|---|---|---|
| 4,958,153 | 9/1990 | Murata et al. | 379/94 X |
| 5,033,079 | 7/1991 | Catron et al. | 379/94 X |
| 5,099,511 | 3/1992 | Matsumoto | 379/233 X |

FOREIGN PATENT DOCUMENTS

| | | | |
|---|---|---|---|
| 3644228 | 7/1988 | Fed. Rep. of Germany | 379/211 |
| 0061499 | 3/1987 | Japan | 379/233 |
| 0085466 | 3/1989 | Japan | 379/211 |
| 90/03702 | 4/1990 | World Int. Prop. O. | 379/233 |

Primary Examiner—James L. Dwyer
Assistant Examiner—Harry S. Hong
Attorney, Agent, or Firm—Stevens, Davis, Miller & Mosher

[57] ABSTRACT

A direct dialing-in method in a PABX is disclosed. In this method, a called party number translation table storing a plurality of pairs of first and last addresses for defining address groups, each constituted of a predetermined number of serial numbers, and specified addresses set for all kinds of terminals, at each group, is prepared. A called party number is extracted from the called party number information element of a SET UP message from a central exchange in ISDN having received a direct dialing-in number. It is checked with the aid of the translation table which of the address groups includes the called party number. The called party number is converted into a relative address in an address group including the called party number. The kind of a terminal on a call side is judged from the bearer capability information element and the high layer compatibility information element of the SET UP message simultaneously with the determination of the relative address. A specified address corresponding to the kind of the terminal is read out from the called party number translation table, and the read-out, and the specified address is added to the relative address, to obtain the extension number of the terminal.

3 Claims, 6 Drawing Sheets

| | 300 |
|---|---|
| 301 | THE NUMBER OF DIGITS OF A CALLED PARTY NUMBER |
| 302 { | THE FIRST CALLED PARTY NUMBER |
| | THE LAST CALLED PARTY NUMBER |
| 304 | THE EXTENSION NUMBER FOR TELEPHONE |
| | THE EXTENSION NUMBER FOR MODEM |
| 305 | THE EXTENSION NUMBER FOR DATA TERMINAL |
| | THE EXTENSION NUMBER FOR FACSIMILE GROUP 2/3 |
| | THE EXTENSION NUMBER FOR FACSIMILE GROUP 4 |
| | THE EXTENSION NUMBER FOR D-CHANNEL PACKET |
| | THE EXTENSION NUMBER FOR B-CHANNEL PACKET |
| 303 { | THE FIRST CALLED PARTY NUMBER |
| | THE LAST CALLED PARTY NUMBER |
| | THE EXTENSION NUMBER FOR TELEPHONE |
| | THE EXTENSION NUMBER FOR MODEM |
| | THE EXTENSION NUMBER FOR DATA TERMINAL |
| | THE EXTENSION NUMBER FOR FACSIMILE GROUP 2/3 |
| | THE EXTENSION NUMBER FOR FACSIMILE GROUP 4 |
| | THE EXTENSION NUMBER FOR D-CHANNEL PACKET |
| | THE EXTENSION NUMBER FOR B-CHANNEL PACKET |
| | |
| | |
| | ⋮ |
| | |

FIG.4  400

| |
|---|
| 401 — THE NUMBER OF DIGITS OF A CALLED PARTY NUMBER |
| 402 — THE FIRST DIRECT DIALING-IN NUMBER |
| 404 — THE FIRST EXTENSION NUMBER FOR TELEPHONE |
| THE FIRST EXTENSION NUMBER FOR MODEM |
| 405 — THE FIRST EXTENSION NUMBER FOR DATA TERMINAL |
| THE FIRST EXTENSION NUMBER FOR FACSIMILE GROUP 2/3 |
| THE FIRST EXTENSION NUMBER FOR FACSIMILE GROUP 4 |
| THE FIRST EXTENSION NUMBER FOR D-CHANNEL PACKET |
| THE FIRST EXTENSION NUMBER FOR B-CHANNEL PACKET |
| 403 — THE SECOND DIRECT DIALING-IN NUMBER |
| THE SECOND EXTENSION NUMBER FOR TELEPHONE |
| THE SECOND EXTENSION NUMBER FOR MODEM |
| THE SECOND EXTENSION NUMBER FOR DATA TERMINAL |
| THE SECOND EXTENSION NUMBER FOR FACSIMILE GROUP 2/3 |
| THE SECOND EXTENSION NUMBER FOR FACSIMILE GROUP 4 |
| THE SECOND EXTENSION NUMBER FOR D-CHANNEL PACKET |
| THE SECOND EXTENSION NUMBER FOR B-CHANNEL PACKET |
| |
| |
| |
| |
| |
| THE Nth DIRECT DIALING-IN NUMBER |
| THE Nth EXTENSION NUMBER FOR TELEPHONE |
| THE Nth EXTENSION NUMBER FOR MODEM |
| THE Nth EXTENSION NUMBER FOR DATA TERMINAL |
| THE Nth EXTENSION NUMBER FOR FACSIMILE GROUP 2/3 |
| THE Nth EXTENSION NUMBER FOR FACSIMILE GROUP 4 |
| THE Nth EXTENSION NUMBER FOR D-CHANNEL PACKET |
| THE Nth EXTENSION NUMBER FOR B-CHANNEL PACKET |

FIG. 5

| 500 |
|---|
| 501 — THE NUMBER OF DIGITS OF A CALLED PARTY NUMBER |
| 502 { THE FIRST CALLED PARTY NUMBER |
| THE LAST CALLED PARTY NUMBER |
| 503 — THE FIRST EXTENSION NUMBER FOR TELEPHONE |
| 504 { THE FIRST CALLED PARTY NUMBER |
| THE LAST CALLED PARTY NUMBER |
| 505 — THE FIRST EXTENSION NUMBER FOR MODEM |
| 506 { THE FIRST CALLED PARTY NUMBER |
| THE LAST CALLED PARTY NUMBER |
| 507 — THE FIRST EXTENSION NUMBER FOR DATA TERMINAL |
| THE FIRST CALLED PARTY NUMBER |
| THE LAST CALLED PARTY NUMBER |
| THE FIRST EXTENSION NUMBER FOR FACSIMILE GROUP 2/3 |
| THE FIRST CALLED PARTY NUMBER |
| THE LAST CALLED PARTY NUMBER |
| THE FIRST EXTENSION NUMBER FOR FACSIMILE GROUP 4 |
| THE FIRST CALLED PARTY NUMBER |
| THE LAST CALLED PARTY NUMBER |
| THE FIRST EXTENSION NUMBER FOR D-CHANNEL PACKET |
| THE FIRST CALLED PARTY NUMBER |
| THE LAST CALLED PARTY NUMBER |
| THE FIRST EXTENSION NUMBER FOR B-CHANNEL PACKET |

FIG. 6
PRIOR ART

DIRECT DIALING-IN METHOD IN A PABX

BACKGROUND OF THE INVENTION

1. Field of the Invention

The present invention relates to a direct dialing-in method in a private automatic branch exchange (PABX) which has the user-network interface layer of the integrated services digital network (ISDN), especially to the direct dialing-in method which is capable of discriminating the attributes of a variety of terminals.

2. Description of the Prior Art

Figure 6:
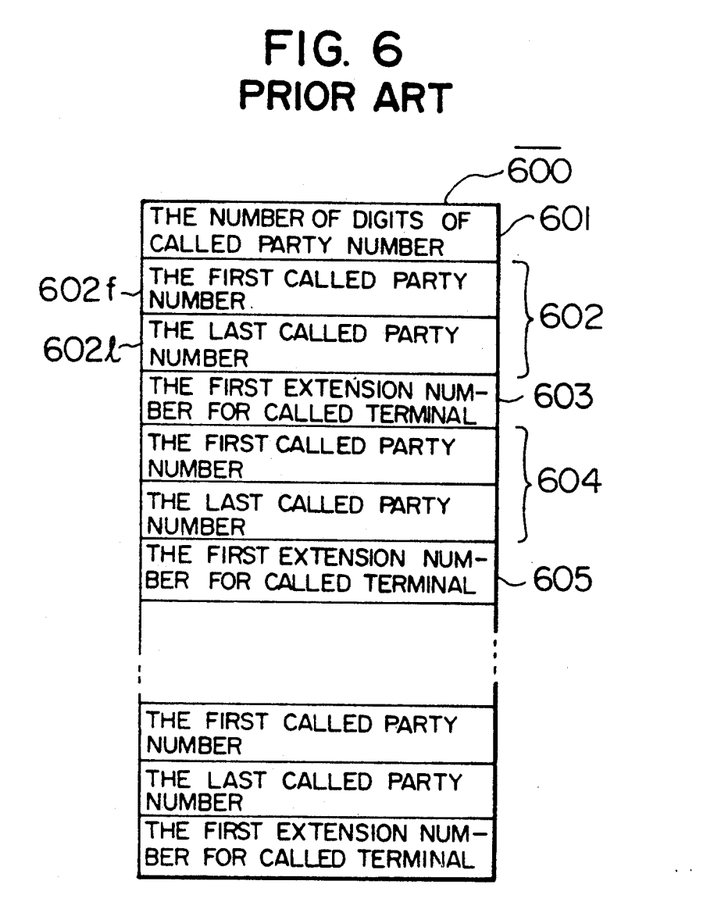
FIG. 6 is a diagram showing a conventional, called party number translation table.

In a conventional PABX connected to ISDN, an extension number is determined by a called party number information element included in a SETUP message in accordance with a called party number translation table 600 as shown in FIG. 6.

The called party number translation table 600 stores the number of digits 601 in a direct dialing-in number from which is derived the extension number in a PABX at a called side, a first and a last number (602f and 6021) for defining the extent of a called party number group with the above number of digits, and the first extension number corresponding to the first called party number.

When a calling party dials the dialing-in number of a called party, this direct dialing-in number is set in the called party number information element of the SETUP message and is sent out from a PABX at a calling side to a PABX at a called side across ISDN. When the SETUP message is received on the PABX in a called side, a central processing unit 31 in a PABX extracts a called party number having the number of digits which is specified by the column 601 of a called party number translation table 600 from the above direct dialing-in number. Then, the central processing unit 31 determine, to which address group the called party number belongs in the column 602, 604, . . . on the above called party number translation table 600.

From the difference between the called party number and the first called party number of the address group including the called party number, a relative address in the address group is calculated. The relative address is added to the first extension number. As a result, the sum thus obtained is an extension number of the called terminal. Now, an actual example will be explained of the conventional direct dialing-in method in the case mentioned below:

The direct dialing-in number on the contract with ISDN: 930-1231.

An extension number of a telephone: 231.

| Content of called party number translation table | |
|---|---|
| the number of digits of called party number | 4 |
| the first called party number | 1200 |
| the last called party number | 1300 |
| the first extension number for called terminal | 200 |

In this case, the direct dialing-in number received by the PABX is 9301231. The four least significant digits (=1231) of the direct dialing-in number become a called party number. This called party number is included in an address group assigned by the first called party number (=1200) and the last called party number (=1300). Accordingly, the difference between the called party number (=1231) and the first called party number (=1200) is 31. This difference (=31) is added to the first extension number (=200), and the result of addition (=231) is the extension number of the called terminal.

In the above conventional direct dialing-in method, however, the called party number translation table 600 is prepared in such a manner that the direct dialing-in number is disposed on a one-to-one basis for the extension number of the PABX. Accordingly, in a system where a PABX accommodates a variety of terminals such as a telephone and a data terminal etc., it arises the problem that different direct dialing-in numbers are required for a plurality of terminals of a PABX.

SUMMARY OF THE INVENTION

It is an object of the present invention to provide the direct dialing-in method in a PABX which can solve the above problem of the prior art, and can decide an extension number for a kind of terminal on the basis of a single direct dialing-in number received in a PABX at a called side.

In order to attain the above object, according to an aspect of the present invention, there is provided a direct dialing-in method in a PABX, in which a called party number translation table storing therein a plurality of pairs of the first and the last addresses for defining address groups each constituted of a predetermined serial called party number, and specified addresses set for all kinds of terminals, at each address group, is prepared; a called party number is extracted from the called party number information element of a SETUP message; it is checked which of the address groups includes the called party number in the called party translation table, the called party number is converted into a relative address in the above address group including the called party number; the kind of a terminal to be called on the called side is judged from the bearer capability information element and the high layer compatibility information element included in the SETUP message, and then, a specified address corresponding to the kind of the terminal is selected from the called party number translation table; and the sum of the above specified address and the relative address decides the extension number of the terminal.

According to another aspect of the present invention, there is provided a direct dialing-in method in a PABX, in which a called party number translation table storing therein all direct dialing-in numbers on the contract with ISDN, and specified addresses of all kinds of terminals being set for each partial direct dialing-in number, is prepared; address information is extracted with a predetermined number of digits, from the called party number information element of an ISDN SETUP message from a; the address information thus obtained is compared with the direct dialing-in numbers on the called party number translation table; if the address information agrees with one of the direct dialing-in numbers in the called party number translation table the kind of a terminal to be called on the called side is judged from the bearer capability information element and high layer compatibility information element included in the SETUP message and a specified address corresponding to the kind of the terminal is selected as the extension number of the terminal from the called party number translation table.

According to a further aspect of the present invention, there is provided a direct dialing-in method in a PABX, in which a called party number translation table storing therein a plurality of a pairs of first and a last address for defining address groups each of which constituted of a predetermined number of serial called party numbers, and a specified address assigned for one kind of terminal, at each address group; is prepared, the kind of a terminal to be called on the called side is judged from a bearer capability information element and a high layer compatibility information element included in a SETUP message from ISDN a specified address group corresponding to the above kind of the terminal is selected in the called party number translation table; a called party number extracted from the called party number information element of the SETUP message, and is converted into a relative address in the above address group corresponding to the kind of the terminal; and a specified address corresponding to the kind of the terminal is added to the above relative address, and then the result of addition becomes the extension number of the terminal.

DESCRIPTION OF THE PREFERRED EMBODIMENTS

According to the present invention, extension numbers of different kinds of terminals can be assigned for a single direct dialing-in number. Accordingly, even in a case where a PABX accomodates various kinds of terminals such as a telephone and a data terminal, the kind of a terminal to be called at on the called side is judged from a bearer capability information element and a high layer compatibility information element of a SETUP message, and the extension number of each terminal is determined on the basis of the above judgement.

Figure 1:
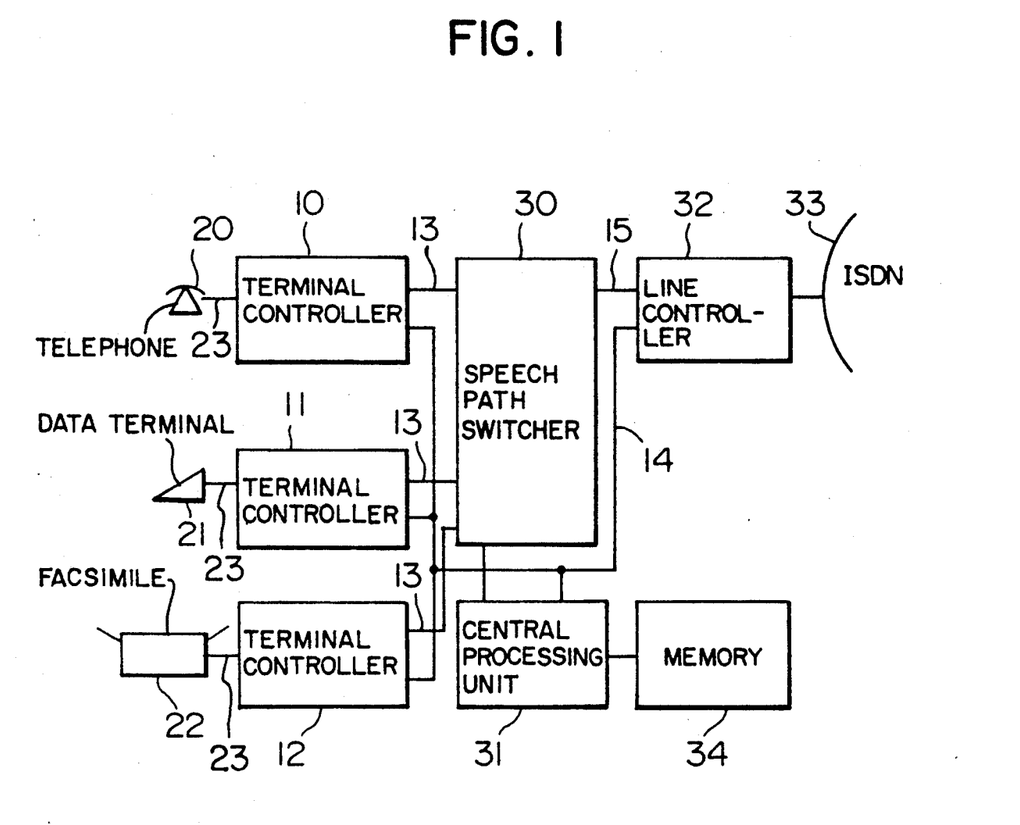
FIG. 1 is a functional block diagram showing a PABX, to which a direct dialing-in method according to the present invention is applicable.

FIG. 1 is a functional block diagram showing an example of a PABX, to which a direct dialing-in method according to the present invention is applicable.

Referring to FIG. 1, a PABX connected to an ISDN is provided with a plurality of terminal controllers 10, 11 and 12, which are connected to an extension telephone 20, a data terminal 21 and a facsimile 22 through extension lines 23, respectively. Further, the terminal controllers 10, 11 and 12 are connected to a speech path switch 30 through data transmission lines 13. A central processing unit 31 is connected to the terminal controllers 10, 11 and 12 and a line controller 32 through control lines 14. The line controller 32 is connected to the speech path switch 30 through a data transmission line 15, and is also connected to ISDN 33.

Figure 3:
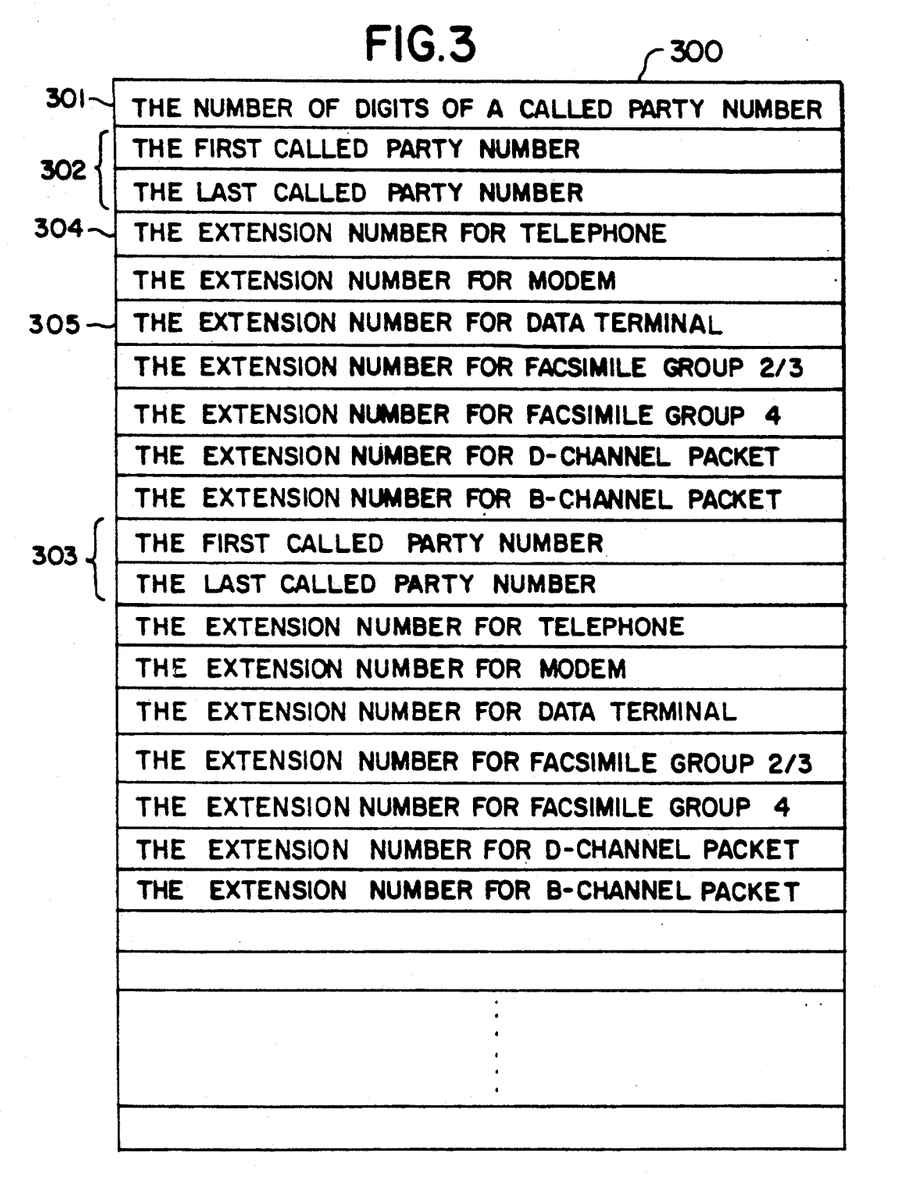
FIG. 3 is a diagram showing a called party number translation table for use in a first embodiment of a direct dialing-in method according to the present invention.
Figure 4:
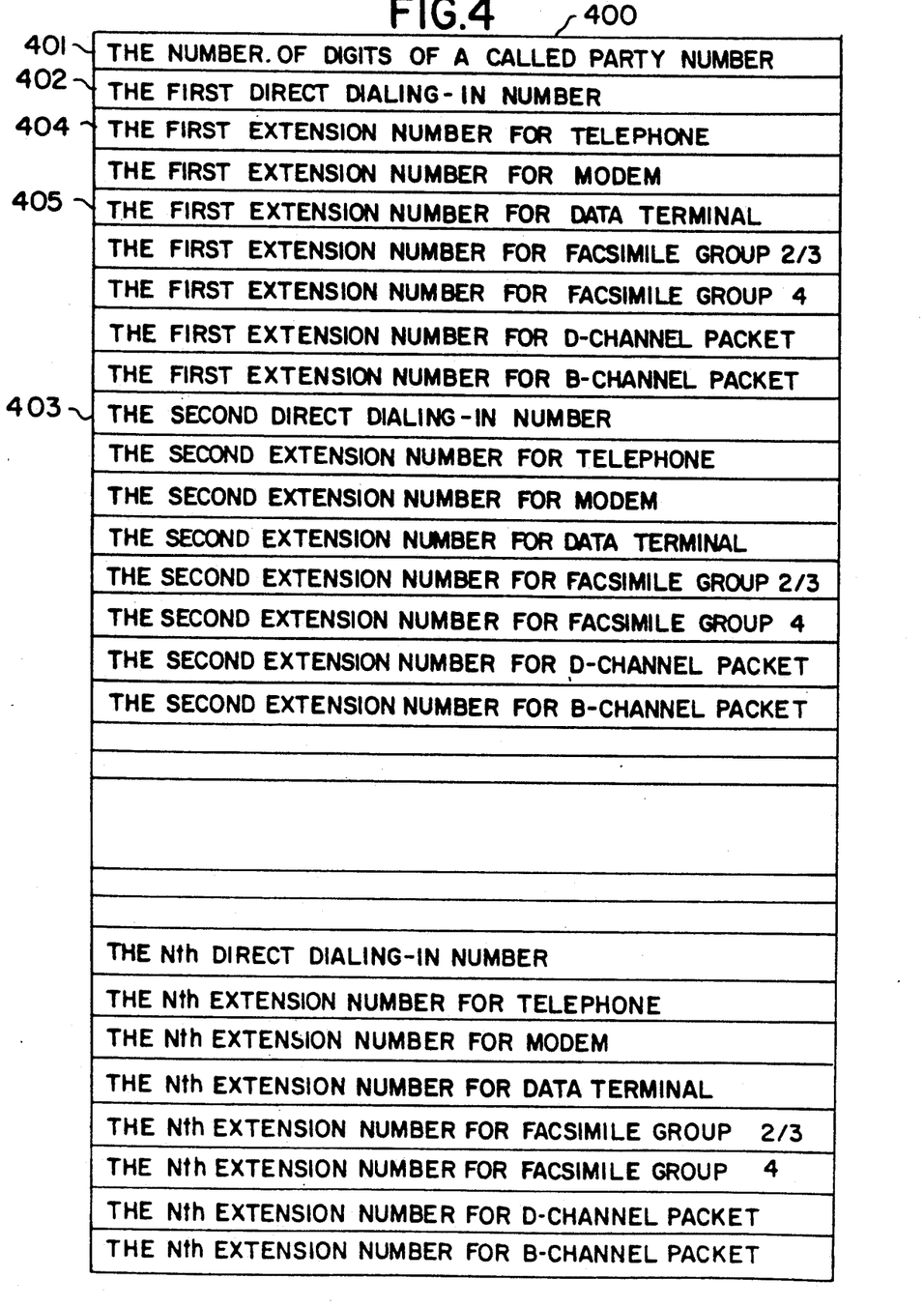
FIG. 4 is a diagram showing a called party number translation table for use in a second embodiment of a direct dialing-in method according to the present invention.
Figure 5:
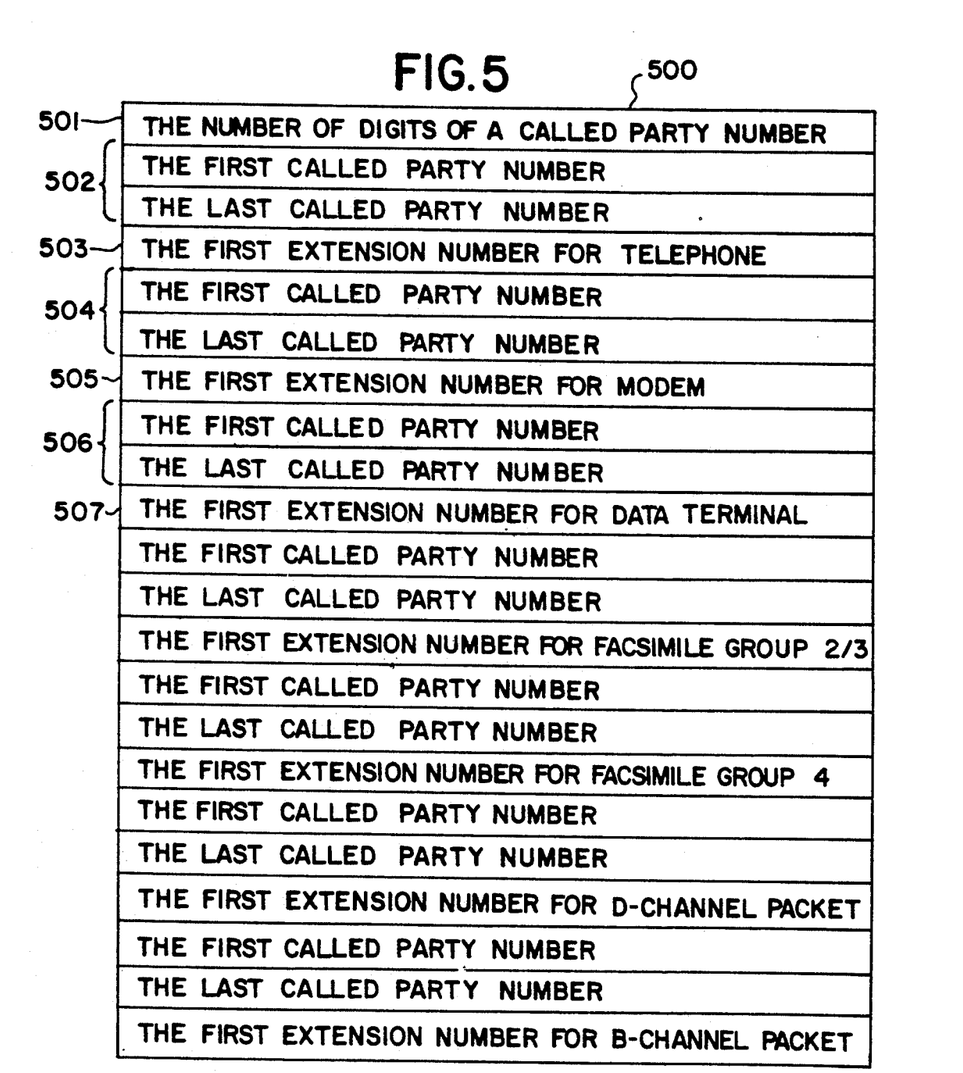
FIG. 5 is a diagram showing a called party number translation table for use in a third embodiment of a direct dialing-in method according to the present invention.

A memory 34 connected to the central processing unit 31 stores software resources (not shown) for controlling an incoming call by the central processing unit 31, and also stores called party number translation tables shown in FIGS. 3, 4 and 5. Each of the translation tables contains therein the number of digits of a called party number extracted from a direct dialing-in number, the first and last called party numbers for specifying each of a plurality of address groups which are obtained by dividing consecutive called party numbers having the above number of digits, and a specified extension number for each kind of terminal.

Figure 2:
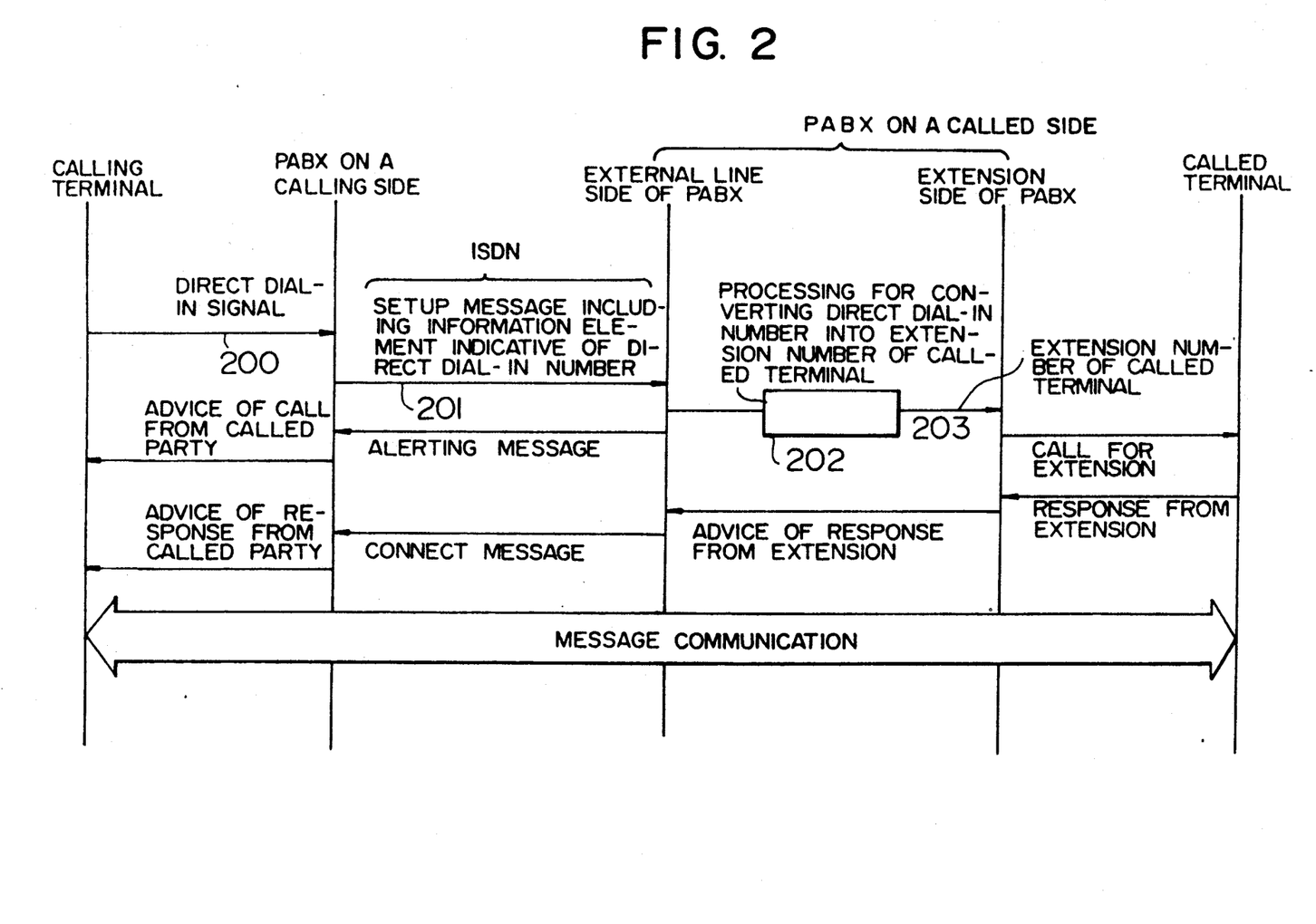
FIG. 2 is a diagram showing an example of a message sequence for the ISDN direct dialing-in service.

FIG. 2 shows an example of a message sequence for the ISDN direct dialing-in service.

Referring to FIG. 2, let us suppose a calling terminal to be a telephone. When a calling party dials the direct dialing-in number of a called party, a PABX (shown in FIG. 2) on the calling side sends a direct dialing-in signal 200 to an ISDN, and the ISDN sends a SETUP message 201 which includes the direct dialing-in number as the called party number information element, to a PABX at the called side.

When the PABX on the called side receives the SETUP message 201, the central processing unit 33 carries out a conversion processing 202 for converting the direct dialing-in number into the extension number of a called terminal.

Now, explanation will be made of a first embodiment of a direct dialing-in method according to the present invention. The conversion processing 202 in the present embodiment will be explained, with reference to FIGS. 1 to 3.

FIG. 3 shows a called party number translation table used in the present embodiment.

Referring to FIG. 3, a called party number translation table 300 stores therein the number 301 of digits of a called party number, a plurality of called party number groups 302, 303, . . . each of which is defined by a first and a last called party number, and a plurality of first extension numbers set for different kinds of terminals, at each called party number group.

The central processing unit 31 extracts a number with least significant digits, the number of least significant digits being equal to the number 301 of digits, from a direct dialing-in number specified by the called party number information element of the SETUP message, as a called party number. Then, it is checked which of the called party number groups 302, 303, . . . includes the above called party number.

Thereafter, a difference between the called party number and the first called party number of the called party number group including the above called party number, is a relative address in this called party number group.

Next, the central processing unit 31 judges the kind of a terminal to be called at the called side, from a bearer capability information element and a high layer compatibility information element included in the SETUP message.

Now, if the kind of the terminal judged from the above information elements is a telephone and the called party number group 302 includes the called party number, the first extension number 304 set for a telephone is added to the above-mentioned relative address in the called party number group 302, and then is obtained an extension number 203. Thus, the terminal controller 10 calls the extension telephone 20 through an extension line 23.

Further, in a case where the same direct dialing-in number as mentioned above is assigned to a data terminal and the called party number group 302 includes the called party number then of a terminal at the called side is the data terminal 21 of the first extension number 305 for a data terminal is read out from the called number translation table 300.

Now, an actual example will be explained.

Direct dialing-in number on the contract with ISDN: 930-1231.

Extension number of a telephone: 231
Extension number of a data terminal: 281

| Contents of called party number translation table | |
|---|---|
| the number of least significant digits of a called party number | 4 |
| the first called party number | 1200 |
| the last called party number | 1300 |
| the first extension number for a telephone | 200 |
| first extension number for a MODEM | (omitted) |
| the first extension number for a data terminal | 250 |
| the first extension number for facsimile group 2/3 | (omitted) |
| the first extension number for facsimile group 4 | (omitted) |
| the first extension number for D-channel packet | (omitted) |
| the first extension number for B-channel packet | (omitted) |

In this case, the direct dialing-in number received by the PABX from ISDN is 9301231. Four least significant digits of the direct dialing-in number (=1231) are, a called party number of 1231. This called party number is included in the address group defined by the first called party number (=1200) and the last called party number (=1300). Accordingly, the difference (=31) between the called party number (=1231) and the first called party number (=1200) is obtained.

When the kind of a terminal to be called at the called side is the telephone 20, the above difference (=31) is added to the first extension number (=200) for a telephone, and the result of addition (=231) is the extension number of the telephone 20.

When the kind of a terminal to be called at the called side is the data terminal 21, the difference (=31) is added to the first extension number (=250) for a data terminal, and then obtain the extension number (=281) of the data terminal 21 is obtained.

As mentioned above, according to the present embodiment, extension numbers of different kinds of terminals (that is, extension numbers of terminals having different attributes) can be determined for a single direct dialing-in number.

Accordingly, in a system where a PABX accommodates various kinds of terminals such as a telephone and a data terminal etc., a calling party can call a single specified terminal only by dialing a direct dialing-in number.

Next, explanation will be made of a second embodiment of a direct dialing-in method according to the present invention. The conversion processing 202 carried out in the present embodiment will be explained, with reference to FIGS. 1, 2 and 4.

FIG. 4 shows a called party number translation table used in the present embodiment.

Referring to FIG. 4, a called party number translation table 400 stores therein the number 401 of digits of a called party number, a plurality of partial direct dialing-in numbers, and extension numbers of different kinds of terminals set for each partial direct dialing-in number.

The central processing unit 31 extracts a number with least significant digits, the number of least significant digits being equal to the number 401 of digits, from the direct dialing-in number specified by the called party number information element of the SETUP message. The called party number is compared with the partial direct dialing-in numbers 402, 403, ... When the called party number agrees with one of the partial direct dialing-in numbers 402, 403 the central processing unit 31 judges the kind of a terminal to be called at the called side, from a bearer capability information element and a high layer compatibility information element of the SETUP message.

In this case, the kind of a terminal to be called at the called side is judged to be a telephone. An extension number 404 for telephone is assigned on the called party number translation table 400 to be used as the extension number 203. Thus, the terminal controller 10 calls the extension telephone 20 through an extension line 23.

Further, in a case where the kind of a called terminal to be called is the data terminal 21, an extension number 405 for a data terminal is assigned as the extension number of the data terminal 21.

As mentioned above, according to the present embodiment, different extension numbers can be assigned for a single direct dialing-in number.

In the present embodiment, the partial direct dialing-in numbers listed on the translation table 400 is not always required to be serial numbers, and extension numbers of a plurality of kinds of terminals can be freely set for a single direct dialing-in number.

Now, an actual example will be explained in the case mentioned below.

Direct dialing-in number on the contract with ISDN: 930-1231.

Extension number of a telephone: 231.
Extension number of data terminal: 281.

| Contents of called party number translation table | |
|---|---|
| the number of least significant digits of a called party number | 4 |
| partial direct dialing-in | 1231 |
| the extension number for a telephone | 231 |
| the extension number for a MODEM | (omitted) |
| the extension number for a data terminal | 281 |
| the extension number for facsimile group 2/3 | (omitted) |
| the extension number for facsimile group 4 | (omitted) |
| the extension number for D-channel packet | (omitted) |
| the extension number for B-channel packet | (omitted) |

In this case, the direct dialing-in number received by the PABX is 9301231. Accordingly, four least significant digits of this direct dialing-in number agree with the partial direct dialing-in number (=1231).

When the kind of a terminal to be called at the called side is a telephone, the extension number (=231) is assigned as the extension number of the telephone 20.

When the kind of a terminal to be called at the called side is a data terminal, the extension number (=281) is assigned as the extension number of the data terminal 21.

Next, explanation will be made of a third embodiment of a direct dialing-in method according to the present invention. The conversion processing in the present embodiment will be explained, with reference to FIGS. 1, 2 and 5.

FIG. 5 shows a called party number translation table used in the present embodiment. Referring to FIG. 5, a called party number translation table 500 stores therein the number 501 of digits of a called party number, a plurality of called party number groups 502, 504, 506, ... each of which is defined by the first and last called party numbers, and the first extension numbers set for different kinds of terminal which are disposed on a one-to-one basis for each called party number group.

The central processing unit 31 judges the kind of a terminal to be called at the called side, from the bearer capability information element and high layer compatibility information element of the SETUP message.

In this case the kind of a terminal to be called at the called side is judged to be a telephone. The first extension number 503 for a telephone is assigned on the called party number table 500.

Next, least significant digits, the number of which is equal to the number 501 of digits listed on the called party number table 500, are taken out from a direct dialing-in number specified by the called party number information element of the SETUP message, to be used as a called party number. It is checked whether or not the called party number is included in the called party number group 502 defined by the first and last called party numbers. When the called party number is included in the group 502, the first extension number 503 for a telephone corresponds to the direct dialing-in number. Thus, the difference between the called party number and the first called party number of the group 502 is added to the first extension number for a telephone, and then is obtained the extension number of the telephone 20.

Further, in a case where the same direct dialing-in number as mentioned above is assigned to a data terminal, it is checked whether or not a called party number group 507 for a data terminal includes the above-mentioned called party number. When the called party number is included in the called party number group 507, the difference between the called party number and the first called party number of the above group is added and then is obtained the first extension number, to the extension number of the data terminal 21.

Now, an actual example will be explained in the case mentioned below.

Direct dialing-in number on the contract with ISDN: 930-1231.

Extension number of telephone: 231.
Extension number of data terminal: 281.

| Contents of a called party number translation table | |
| --- | --- |
| the number of digits of a called party number | 4 |
| the first called party number | 1200 |
| the last called party number | 1300 |
| the first extension number for telephony | 200 |
| the first extension number for MODEM | (omitted) |
| the first extension number for data terminal | 250 |
| the first extension number for facsimile group 2/3 | (omitted) |
| the first extension number for facsimile group 4 | (omitted) |
| the first extension number for D-channel packet | (omitted) |
| the first extension number for B-channel packet | (omitted) |

In this case, the direct dialing-in number received by the PABX is 9301231. When the kind of a terminal to be called at the called side is the telephone, the first extension number (=200) for a telephone is specified. In this case, four least significant digits, (=1231) of the above direct dialing-in number are a called party number. The difference (=31) between the called party number (=1231) and the first called party number (=1200) is added to the first extension number (=200), and then the extension number (=231) of the telephone 20 is obtained.

I claim:

1. A direct dialing-in method in a PBX, comprising the steps of:
    providing a called party number translation table which stores the number of digits of a called party number, a plurality of pairs of a first and a last address for defining address groups, each of which constitutes a predetermined number of serial numbers, and specified addresses set for a plurality of kinds of terminals, at each address group;
    extracting a called party number as a direct dialing-in number from a called party number information element of a SET UP message from a central exchange in ISDN;
    checking which of the address groups includes the called party number, with the aid of said called party number translation table;
    converting said called party number into an address corresponding to said called party number in an address group which includes said called party number;
    judging a kind of terminal to be called at a called side, from a bearer capability information element and a high layer compatibility information element of the SET UP message;
    selecting a specified address corresponding to the judged kind of terminal, from said called party number translation table; and
    adding said specified address to said address in said address group which includes said called party number, to obtain the extension number of a terminal from among the judged kind of terminal.

2. A direct dialing-in method in a PBX, comprising the steps of:
    providing a called party number translation table which stores the number of digits of a called party number, a plurality of direct dialing-in numbers with said number of digits, and specified addresses of a plurality of kinds of terminals set for each direct dialing-in number;
    extracting a called party number as a direct dialing-in number which has a predetermined number of digits, from a called party number information element of a SET UP message from a central exchange in ISDN;
    comparing said called party number as a direct dialing-in number with the plurality of direct dialing-in numbers on the called party number translation table;
    judging a kind of a terminal to be called at a called side, from a bearer capability information element and a high layer compatibility information element of the SET UP message, when said called party number agrees with one of the direct dialing-in numbers on said called party number translation table; and
    selecting a specified address corresponding to the judged kind of terminal from said called party number translation table, to obtain the extension number of a terminal from among the judged kind of terminal.

3. A direct dialing-in method in a PBX, comprising the steps of:
    providing a called party number translation table which stores the number of digits of a called party number, a plurality of pairs of first and last addresses for defining an address group which corresponds to each kind of terminal, and a specified address set for one kind of terminal at each pair of first and last addresses;

judging a kind of a terminal to be called at a called side from a bearer capability information element and a high layer compatibility information element of a SET UP message from a central exchange in ISDN;

extracting a called party number which has a predetermined number of digits, from a called party number information element of the SET UP message from a central exchange in ISDN;

converting said called party number into an address corresponding to said called party number in an address group which includes said called party number; and adding said address in said address group which includes said called party number to a specified address corresponding to the judged kind of terminal, to obtain the extension number of a terminal from among the judged kind of terminal.

* * * * *